Sept. 2, 1924.                    1,506,870
              G. A. TOAZ
           SPRING LUBRICATOR
          Filed April 17, 1922
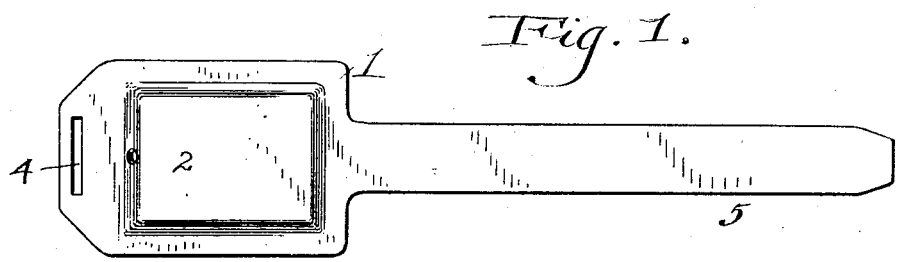
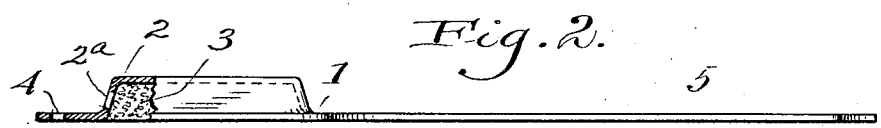
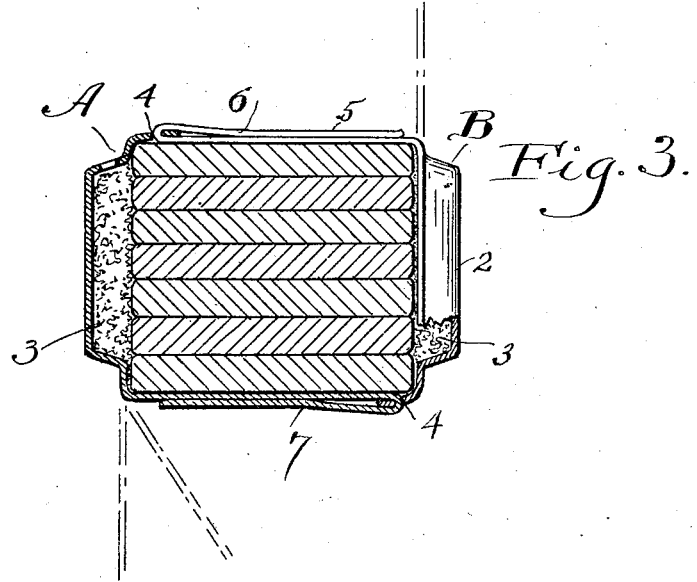

Patented Sept. 2, 1924.

1,506,870

UNITED STATES PATENT OFFICE.

GLENN A. TOAZ, OF CLEVELAND, OHIO.

SPRING LUBRICATOR.

Application filed April 17, 1922. Serial No. 553,992.

*To all whom it may concern:*

Be it known that I, GLENN A. TOAZ, a citizen of the United States, residing at Cleveland, in the county of Cuyahoga and State of Ohio, have invented a certain new and useful Improvement in Spring Lubricators, of which the following is a full, clear, and exact description.

The present invention relates to devices which are intended to be used in connection with a vehicle spring for the purpose of providing a ready source of lubrication for the springs, the lubricating devices being assembled with respect to the springs so that the lubricating means is presented to the edges of the spring, whereby as the spring is used and the leaves of the spring move with respect to each other, lubricant will find its way between the leaves of the spring and lubricate the rubbing surfaces of the spring.

The object of the invention is to provide a device of the character described, which may be made at a low cost of manufacture, which may be readily assembled with respect to a spring, and which will render the expected and desired service.

Reference should be had to the accompanying drawings forming a part of this specification, in which Fig. 1 is a top plan view of the spring lubricating device; Fig. 2 is a sectional elevation of the device shown in Fig. 1; and Fig. 3 is a sectional elevation of a spring, and showing in elevation with portions in section, two co-operating lubricating devices for the spring.

Referring to the drawings, and more particularly to Fig. 1, there is there shown a single unit of a lubricating device which is preferably formed of sheet metal, and formed as a stamping, although the invention is not necessarily limited in this feature. The main portion of the lubricating device is indicated at 1, and formed as a portion of this base 1, but pressed therefrom, is what may be termed a receptacle 2, which is at one end thereof provided with an opening 2ª by which lubricant may be introduced to the interior of the receptacle 2. This receptacle 2 is adapted to have associated therewith a piece of felt or similar packing material such as indicated at 3. At one end of the portion 2 there is a slot 4 and extending from the other end of the portion 1 is a strap member 5.

In mounting the lubricating device upon a spring, the lubricating devices are arranged in pairs, and each serves as a means for supporting and retaining the other lubricating device, and it may be here stated that lubricating devices are preferably identical in form, the respective units of each pair having the opening 2ª at opposite ends of the pans 2. Referring to Fig. 3, we may generally indicate one of the lubricating devices at A, and the second of the lubricating devices at B. These devices will be so assembled with respect to the spring that the felt pad or packing 3 is positioned adjacent the opposite edges of the spring leaves. The strap portion of the lubricator B will be pushed through the slot 4 of the lubricator A, and then the strap will be bent back upon itself as indicated at 6 in Fig. 3. Similarly the strap extension of the lubricator A will be extended through the slot 4 of the lubricator B, and then the strap will be bent back upon itself as indicated at 7 in Fig. 3.

From the foregoing it will be seen that the strap members of each lubricator will co-operate with the slotted portion of the other lubricator to form a holding means, and furthermore, it will be seen that the lubricators proper are mounted and held with respect to the edges of a spring in a very simple and effective manner. Furthermore, it will at once be apparent that the production cost of the lubricating units is very low, but they will perform the same effective lubricating service of more expensive and highly organized devices.

Having described my invention, I claim:

1. A lubricating unit comprising a member forming an open sided receptacle, a strap member extending from adjacent one end of said receptacle, and a strap receiving portion adjacent the other end of said receptacle.

2. A lubricating unit comprising a member having an open sided receptacle, a strap member extending from the first mentioned member adjacent one end of the receptacle, and a strap receiving member extending from the opposite end of the receptacle.

3. A lubricating unit comprising a member having an open sided receptacle, a strap member extending from the said member adjacent one end of the receptacle, and said first mentioned member being provided with a retaining slot at a portion adjacent the other end of the receptacle.

4. A lubricating unit comprising a pressed metal member having a portion in which an open sided receptacle is formed, and a strap member extending from adjacent one end of said receptacle and also provided with a retaining slot adjacent the other end of the receptacle.

5. The combination with a spring to be lubricated, of a lubricating unit at one side of said receptacle which is formed with an extending strap and with a retaining slot, a similar lubricating unit upon the other side of said spring and provided with a strap and slot the same as the first mentioned unit, the strap of the second mentioned unit co-operating with the slot of the first mentioned unit, and the strap of the first mentioned unit co-operating with the slot of the second mentioned unit.

6. The combination with a spring, of two lubricating units which are disposed on opposite sides of the said spring, each of said units being provided with a strap extension and with a slotted retaining portion, the strap of each lubricating unit being extended through the slot of the other lubricating unit and bent back upon itself thereby securing the said lubricating units with respect to each other and to the spring.

In testimony whereof, I hereunto affix my signature.

GLENN A. TOAZ.